(12) United States Patent
Maine et al.

(10) Patent No.: US 8,812,643 B2
(45) Date of Patent: *Aug. 19, 2014

(54) CONVERSION OF HIERARCHICAL INFOSET TYPE DATA TO BINARY DATA

(75) Inventors: Stephen Jared Maine, Seattle, WA (US); Michael J. Coulson, Clyde Hill, WA (US); Tirunelveli R. Vishwanath, Santa Clara, CA (US); Erik B. Christensen, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 244 days.

This patent is subject to a terminal disclaimer.

(21) Appl. No.: 13/176,477

(22) Filed: Jul. 5, 2011

(65) Prior Publication Data
US 2011/0264702 A1    Oct. 27, 2011

Related U.S. Application Data

(63) Continuation of application No. 12/049,171, filed on Mar. 14, 2008, now Pat. No. 8,145,794.

(51) Int. Cl.
*G06F 15/173* (2006.01)
*G06F 15/16* (2006.01)
*G06F 15/177* (2006.01)
*H04L 29/08* (2006.01)

(52) U.S. Cl.
CPC .............................. *H04L 29/08072* (2013.01)
USPC ........... 709/223; 709/217; 709/218; 709/219; 709/220; 709/221; 709/222; 709/224; 709/225; 709/226; 709/227; 709/228; 709/229; 709/230; 709/246; 709/248; 707/790; 707/791; 707/792; 707/793; 707/794; 707/795; 707/796; 707/802; 707/803; 707/804; 707/805; 707/806; 707/807; 707/808; 707/809; 707/810; 707/811; 707/812; 707/E17.127; 707/E17.128; 707/E17.129; 707/E17.13; 707/E17.131; 707/E17.132; 707/E17.133; 707/E17.134; 707/E17.143; 713/150; 713/151; 713/152

(58) Field of Classification Search
USPC ......... 709/221, 229–230, 246, 217, 218, 219, 709/220, 222, 223, 224, 225, 226, 227, 228, 709/248; 707/793, E17.127, 790, 791, 792, 707/794, 795, 796, 802, 803, 804, 805, 806, 707/807, 808, 809, 810, 811, 812, E17.128, 707/E17.129, E17.13, E17.131, E17.132, 707/E17.133, E17.134, E17.143; 713/150, 713/151, 152, 200, 201
See application file for complete search history.

(56) References Cited

U.S. PATENT DOCUMENTS

| | | |
|---|---|---|
| 5,486,865 A | 1/1996 | James |
| 5,859,826 A | 1/1999 | Ueno |

(Continued)

OTHER PUBLICATIONS

Dynamic Adaptive Marshalling a Dynamic Solution to Middleware Heterogeneity, available at least as early as Mar. 14, 2008, (11 pages) http://www.frcu.utn.edu.ar/deptos/depto_3/32JAIIO/asse/ASSE_12.pdf.

(Continued)

*Primary Examiner* — Saket K Daftuar
(74) *Attorney, Agent, or Firm* — Jim Sfekas; Kate Drakos; Micky Minhas

(57) ABSTRACT

Encoding and/or decoding of messages. On the encoding end, a composite encoder encodes message from an internal format that is used by internal system components into an external format. However, the composite encoder may encode the outgoing messages into different external formats on a per-message basis. For incoming message, a composite decoder decodes incoming messages from any one of a plurality of external formats into the internal format also on a per-message basis. A per-message report mechanism permits internal system components and the encoding/decoding components to communicate information regarding the encoding or decoding on a per message basis. XML messages can be converted automatically into Binary messages.

12 Claims, 3 Drawing Sheets

(56) References Cited

U.S. PATENT DOCUMENTS

| | | | |
|---|---|---|---|
| 5,884,269 A | 3/1999 | Cellier | |
| 5,912,897 A | 6/1999 | Steinback | |
| 6,243,336 B1 | 6/2001 | Schell | |
| 6,256,064 B1 | 7/2001 | Chujoh | |
| 6,356,950 B1 | 3/2002 | Tillmann | |
| 6,493,385 B1 | 12/2002 | Sekiguchi | |
| 6,564,265 B2 | 5/2003 | Tillmann | |
| 6,571,248 B1 | 5/2003 | Kusama | |
| 6,708,182 B1 | 3/2004 | Kobayashi | |
| 6,810,429 B1 | 10/2004 | Walsh | |
| 6,819,776 B2 | 11/2004 | Chang | |
| 6,917,310 B2 | 7/2005 | Pearson | |
| 7,042,869 B1 | 5/2006 | Bender | |
| 7,089,567 B2 | 8/2006 | Girardot | |
| 7,158,990 B1 * | 1/2007 | Guo et al. | 1/1 |
| 7,167,924 B1 | 1/2007 | Symonds | |
| 7,203,139 B2 | 4/2007 | Terada | |
| 7,254,411 B2 | 8/2007 | Cheng | |
| 7,321,968 B1 | 1/2008 | Capellaro | |
| 7,350,199 B2 * | 3/2008 | Ito et al. | 717/141 |
| 7,414,938 B2 | 8/2008 | Kuraoka | |
| 7,440,374 B2 | 10/2008 | Terada | |
| 7,460,725 B2 | 12/2008 | Malladi | |
| 7,509,576 B2 * | 3/2009 | Kanai | 715/239 |
| 7,594,154 B2 | 9/2009 | Vedantham | |
| 7,680,187 B2 | 3/2010 | Kitamura | |
| 7,689,531 B1 | 3/2010 | Diao | |
| 7,702,988 B2 | 4/2010 | Ry | |
| 7,711,673 B1 | 5/2010 | Diao | |
| 7,724,827 B2 | 5/2010 | Liang | |
| 7,756,906 B2 * | 7/2010 | Mehta et al. | 707/803 |
| 7,779,139 B2 | 8/2010 | Vishwanath | |
| 7,831,540 B2 * | 11/2010 | Medi et al. | 707/601 |
| 7,933,933 B2 * | 4/2011 | Petride et al. | 707/803 |
| 2001/0012324 A1 | 8/2001 | Normile | |
| 2002/0057446 A1 | 5/2002 | Long | |
| 2002/0181416 A1 | 12/2002 | Lee | |
| 2003/0018466 A1 * | 1/2003 | Imaura | 704/6 |
| 2003/0023628 A1 * | 1/2003 | Girardot et al. | 707/513 |
| 2003/0046317 A1 * | 3/2003 | Cseri et al. | 707/513 |
| 2003/0069930 A1 | 4/2003 | Van Willigen | |
| 2003/0108104 A1 | 6/2003 | Paulin | |
| 2003/0182128 A1 | 9/2003 | Kuwata | |
| 2004/0024580 A1 | 2/2004 | Salmonsen | |
| 2004/0095241 A1 | 5/2004 | Maloney | |
| 2004/0098667 A1 | 5/2004 | Atkinson | |
| 2004/0263361 A1 | 12/2004 | Pearson | |
| 2005/0050228 A1 | 3/2005 | Perham | |
| 2005/0066267 A1 * | 3/2005 | Kanai | 715/513 |
| 2005/0086594 A1 | 4/2005 | Schlimmer | |
| 2005/0114762 A1 | 5/2005 | Binding | |
| 2005/0117806 A1 | 6/2005 | Rosenberg | |
| 2005/0143104 A1 | 6/2005 | Kim | |
| 2005/0169132 A1 | 8/2005 | Kuraoka | |
| 2005/0181787 A1 | 8/2005 | Judd | |
| 2005/0207262 A1 | 9/2005 | Terada | |
| 2005/0210387 A1 * | 9/2005 | Alagappan et al. | 715/700 |
| 2005/0273705 A1 | 12/2005 | McCain | |
| 2005/0278616 A1 * | 12/2005 | Eller | 715/513 |
| 2006/0106831 A1 * | 5/2006 | Nakanishi | 707/100 |
| 2006/0129689 A1 * | 6/2006 | Ho et al. | 709/230 |
| 2006/0168513 A1 | 7/2006 | Coulson | |
| 2006/0215701 A1 | 9/2006 | Fenelon | |
| 2007/0005613 A1 | 1/2007 | Singh | |
| 2007/0086281 A1 | 4/2007 | Terada | |
| 2007/0094564 A1 | 4/2007 | Rye | |
| 2007/0156919 A1 * | 7/2007 | Potti et al. | 709/238 |
| 2007/0168464 A1 | 7/2007 | Noonan | |
| 2007/0180132 A1 | 8/2007 | Purdy | |
| 2007/0180149 A1 | 8/2007 | Vernal | |
| 2007/0208752 A1 * | 9/2007 | Khaladkar et al. | 707/10 |
| 2007/0258702 A1 | 11/2007 | Sugio | |
| 2007/0271305 A1 * | 11/2007 | Chandrasekar et al. | 707/200 |
| 2008/0028281 A1 | 1/2008 | Miyazaki | |
| 2008/0037883 A1 | 2/2008 | Tsutsumi | |
| 2008/0062018 A1 | 3/2008 | Normile | |
| 2008/0086414 A1 | 4/2008 | Ching | |
| 2008/0098002 A1 * | 4/2008 | Mehta et al. | 707/10 |
| 2008/0120675 A1 | 5/2008 | Morad | |
| 2008/0207182 A1 | 8/2008 | Maharajh | |
| 2009/0112890 A1 * | 4/2009 | Medi et al. | 707/100 |

OTHER PUBLICATIONS

An Experiment in Interoperable Cryptographic Protocol Implementation Using Automatic Code Generation (16 pages) available at least as early as Mar. 14, 2008, http://staff.polito.it/riccardo.sisto/reports/interoperable.ps.

Open Metadata Formats: Efficient XML-Based Communication for High Performance Computing (11 pages) Available at least as early as Mar. 14, 2008.

Bosworth, Adam et al., XML, SOAP, and Binary Data, Feb. 26, 2003, (10 pages) http://www.xml.com/pub/a/2003/02/26/binaryxml.html.

Cabrera, Luis Felipe et al., An Introduction to the Web Services Architecture and Its Specifications, Oct. 2004, (31 pages) http://msdn2.microsoft.com/en-us/library/ms996441.aspx.

Skonnard, Aaron, The XML files May 2001, (6 pages) http://msdn.microsoft.com/msdnmag/issues/01/05/xml/.

U.S. Appl. No. 12/037,842, Nov. 27, 2009, Office Action.
U.S. Appl. No. 12/037,842, May 6, 2010, Notice of Allowance.
U.S. Appl. No. 12/049,171, Sep. 17, 2010, Office Action.
U.S. Appl. No. 12/049,171, Jan. 3, 2011, Office Action.

* cited by examiner

CONVERSION OF HIERARCHICAL INFOSET TYPE DATA TO BINARY DATA

CROSS-REFERENCE TO RELATED APPLICATIONS

This application is a continuation of U.S. patent application Ser. No. 12/049,171, which was filed on Mar. 14, 2008, entitled "ENCODING/DECODING WHILE ALLOWING VARYING MESSAGE FORMATS PER MESSAGE", and which application is hereby expressly incorporated herein in its entirety.

BACKGROUND

The Windows Communication Foundation and other distributed system platforms have a decoding process, in which an external representation (or format) of a message is converted into some internal representation (or format). The external representation of the message is more suited towards the delivery system to get the message into and out of the system, whereas the internal representation can be processed by the system itself. An example of a common internal representation is, for example, eXtensible Markup Language (XML) or Infoset data. Likewise, the system has an encoding process in which an internal representation of a message is converted into some external representation for transport.

Traditionally, the choice of external message formats is static. All messages originating from a certain endpoint are encoded into the same format, and all messages accepted by a certain endpoint are expected to be in a certain format. There is conventionally some level of format auto-detection capabilities for incoming messages. For example, some conventional systems can automatically detect whether an incoming message is using UTF8 or UTF16 character encoding or whether the message is plain XML or is it an MTOM (Message Transmission Optimization Mechanism) message. However, these format differences are not significant enough that different processing is needed further up in the stack. Accordingly, once a basic transform is applied during decoding, no other action need be taken in order to accept the message.

BRIEF SUMMARY

At least some embodiments described herein relate to mechanisms for encoding outgoing messages and/or decoding incoming messages. On the encoding end, a composite encoder encodes messages from an internal format that is used by internal system components into an external format. However, the composite encoder may encode the outgoing messages into different external formats on a per-message basis. A per-message report mechanism permits the internal system components to write encoding informing on a per-message basis, thereby allowing the internal system components to control how particular outgoing messages are encoded. In one embodiment, a programming component offers a programming model that allows a programmer to control the encoding used for particular outgoing messages.

For incoming messages, a composite decoder decodes incoming messages from any one of a plurality of external formats into the internal format also on a per-message basis. The composite decoder is capable of reporting decoding information to the per-message report mechanism, and perhaps is also capable of reading decoding information from the per-message report mechanism. The internal system components might also read the decoding information, allowing such internal system components to perform format-specific processing of the incoming message, even though the internal system components may not have access to the incoming message in its original external format.

In one embodiment, the number of external formats supported by the encoding and/or decoding is extensible. This may be accomplished by adding new encoding components, rather than changing the entire system. Accordingly, a flexible encoding and decoding mechanism is described that allows a system to interface with messages of a variety of external formats, without requiring that the internal system components work directly with all of those external formats. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a flexible mechanism for encoding outgoing messages and/or decoding incoming messages is described. On the encoding end, a composite encoder encodes messages from an internal format that is used by internal system components into an external format. However, the composite encoder may encode the outgoing messages into different external formats on a per-message basis. A per-message report mechanism permits the internal system components to write encoding informing on a per-message basis, thereby allowing the internal system components to control how particular outgoing messages are encoded. In one embodiment, a programming component offers a programming model that allows a programmer to control the encoding used when encoding an outgoing message.

For incoming message, a composite decoder decodes incoming messages from any one of a plurality of external formats into the internal format also on a per-message basis. The composite decoder is capable of reporting decoding information to the per-message report mechanism, and perhaps is also capable of reading decoding information from the per-message report mechanism. The internal system components might also read the decoding information, allowing such internal system components to perform format-specific processing of the incoming message, even though the internal system components may not have access to the incoming message in its original external format.

First, some introductory discussion regarding a computing system that may be used to operate an encoding and decoding environment will be described with respect to FIG. 1. Then, various embodiments of the encoding and decoding mechanism will be described with respect to FIGS. 2 and 3.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
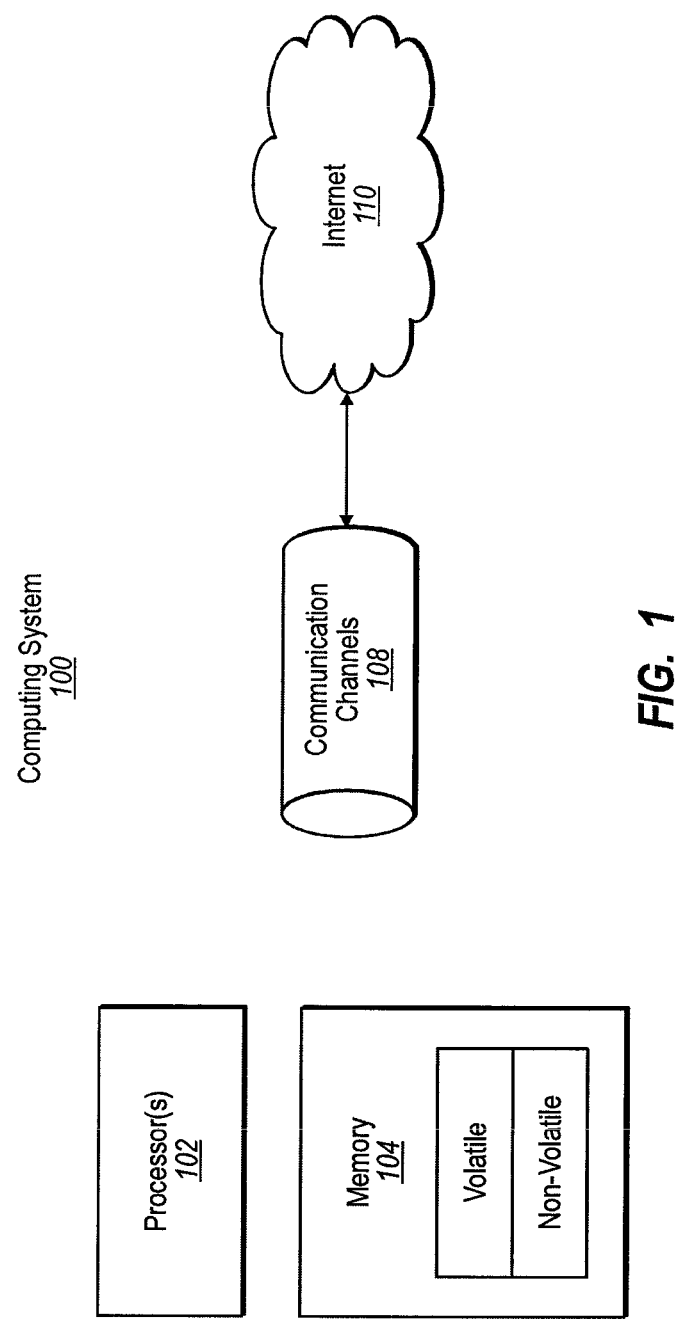
FIG. 1 illustrates an example computing system in which embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, the network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
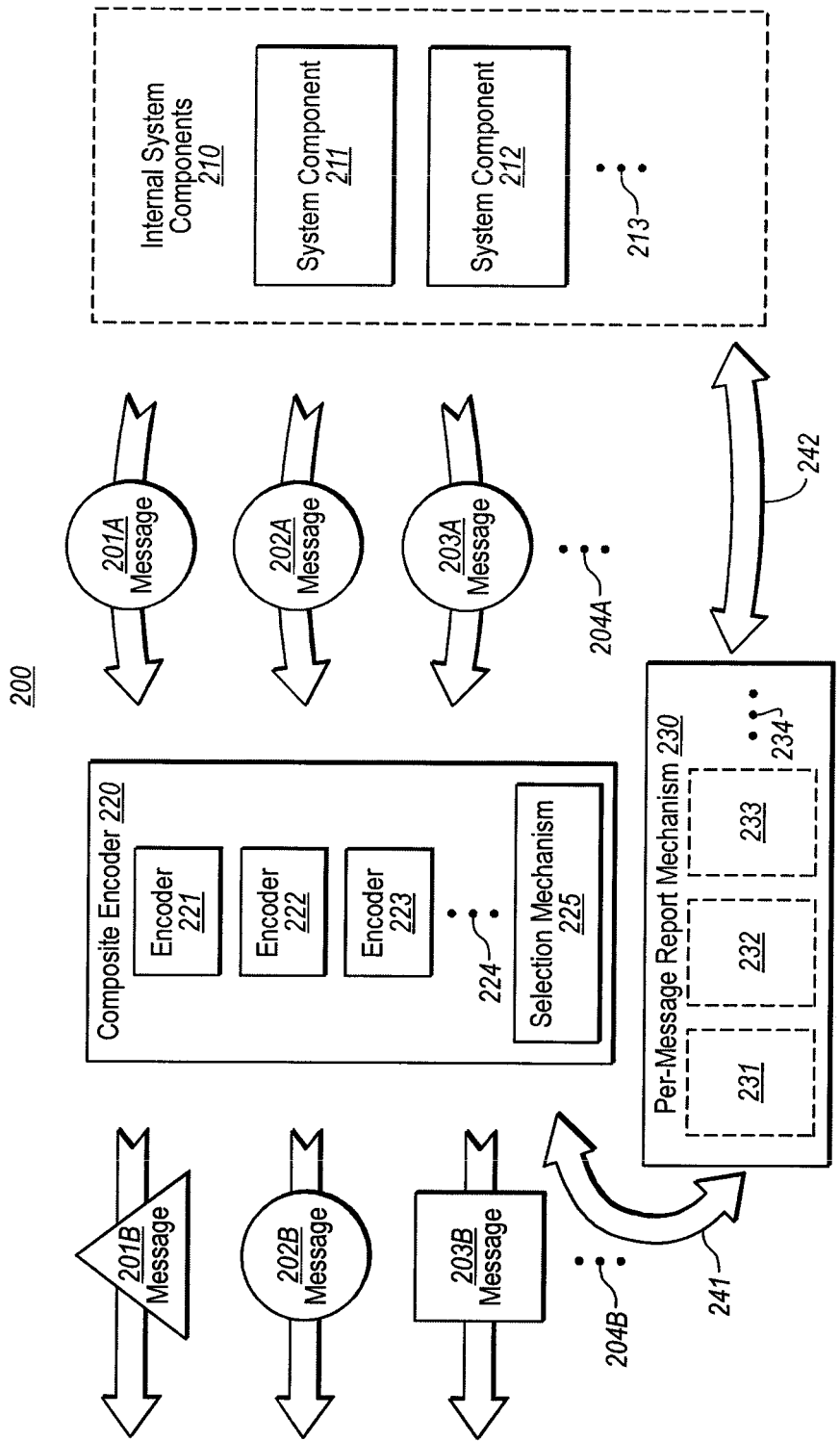
FIG. 2 illustrates an example encoding environment and message flow.
Figure 3:
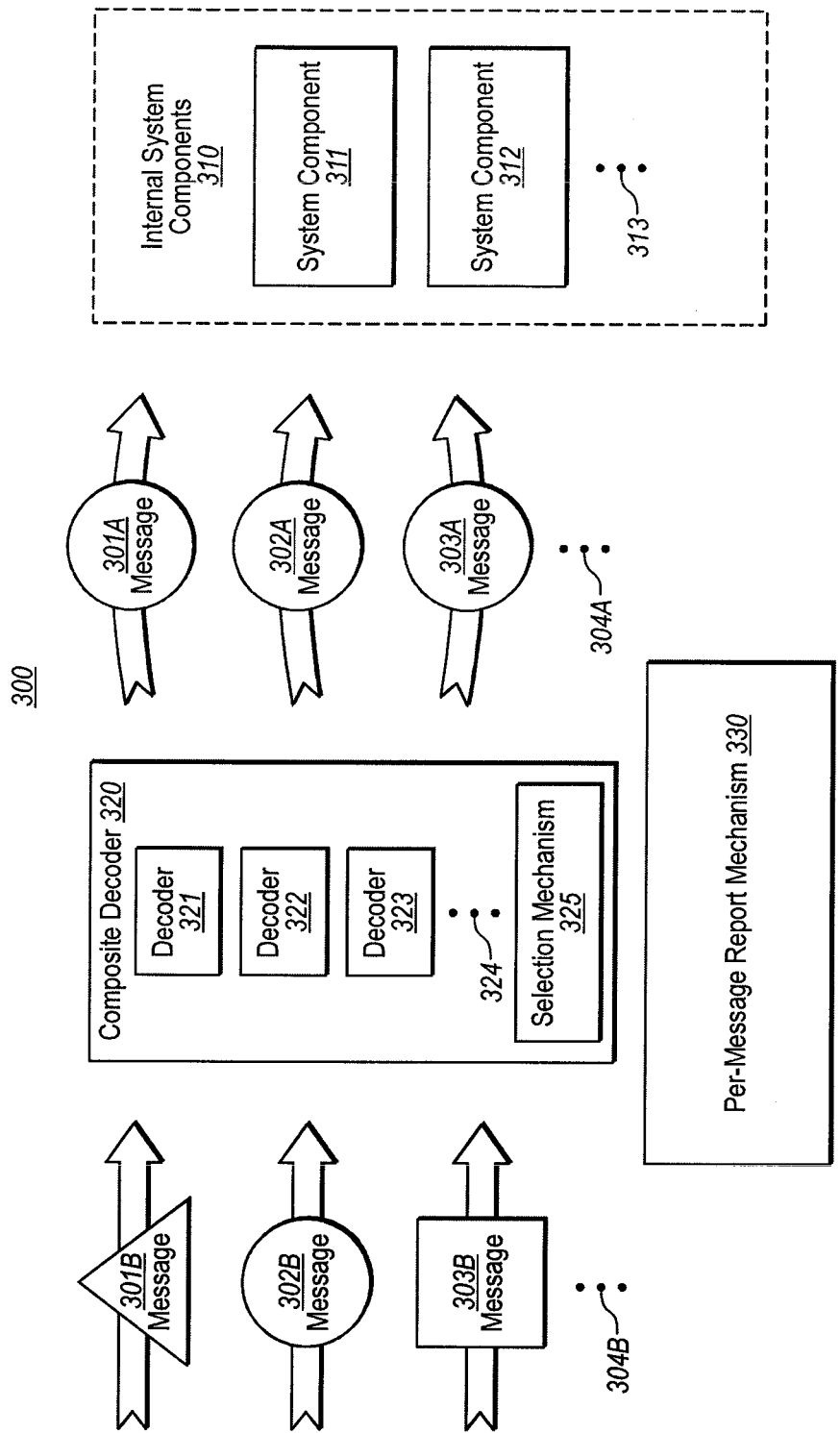
FIG. 3 illustrates an example decoding environment and message flow.

FIG. 2 illustrates encoding environment 200 showing an example message flow associated with the encoding of outgoing messages. FIG. 3 shows a decoding environment 300 showing an example message flow associated with the decoding of incoming messages. The encoding environment 200 and the decoding environment 300 may be shared to provide an environment that does both encoding and decoding. However, the broadest principles described herein are not limited to performing both encoding and decoding, but perhaps could just include encoding, or perhaps just including decoding. This encoding/decoding architecture makes it possible to operate systems in a format-independent way, and allows for new formats to be added in the future by only changing the encoding/decoding components, rather than having to modify the rest of the system.

The encoding environment 200 and/or the decoding environment 300 may be operated using the computing system 100 of FIG. 1, although that is not required. If implemented using the computing system 100, the various components of the encoding environment 200 and decoding environment 300 may be instantiated in memory 104 upon computer-executable instructions of a computer program product being executed by the one or more processors 102. The network 110 may be used for message exchange, although messages may be exchanged between internal components of the computing system 100 as well.

First, the flow of encoding will be described with respect to the encoding environment 200 of FIG. 2. In the encoding example, three messages 201A, 202A, and 203A are subjected to encoding to thereby generate corresponding encoded messages 201B, 202B and 203B. Specifically, messages 201A, 202A and 203A are provided from one or more internal system components 210 to a composite encoder 220.

The system components 210 operate internal to a particular system. There may be quite a number of components operating internally to a system. However, the system components 210 are illustrated as including two system components 211 and 212. The vertical ellipses 213 represents that there may be other numbers (one, or three or more) of system components operating within a system. Complex systems may include numerous system components.

At least some of the system components 210 are configured to operate upon messages having a particular message format. Such a format may be referred to hereinafter as an "internal message format" since they are message formats usable by internal system components 210. In FIGS. 2 and 3, all of the messages are symbolically illustrated as having a particular shape (either a circle, a triangle, or a square). In this symbolism, messages having the same shape are of a common message format. Messages having different shapes are of a different message format.

For instance, messages 201A, 202A and 203A each are symbolized as being circles. This represents that each of the messages 201A and 202A and 203A are of the same message format. This message format is the message format that the internal system components 210 are configured to operate with. As an example, perhaps that message format is eXtensible Markup Language (XML) or Infoset. In that case, the internal system components 210 would be configured to operate using XML messages. However, as will be explained, even though the internal system components 210 are configured to operate with a limited number of internal message formats (and perhaps just one message format), the principles described herein allow systems to communicate outwardly using a variety of message formats.

There is no requirement regarding the timing of delivery of the messages 201A, 202A and 203A to the composite encoder 220. One may be delivered after the other at any time. Nevertheless, they are shown together to show how each message may be encoded differently using the composite encoder 220. The ellipses 204A represents that there may be yet other messages provided by the internal system components 210 to the composite encoder 220. In one embodiment, there may be one composite encoder 220 for each endpoint that the internal system components 210 sends and/or receives messages from. Accordingly, the composite encoder may contain endpoint specific configuration information such as, for example, whether to encode using UTF-8, Unicode, or other text encoding formats.

The composite encoder 220 is configured to encode messages from the internal message format to a plurality of different external message formats on a per-message basis. An external format is a format that might be understood by components outside of the system. Although the composite encoder 220 is illustrated as a single component, the composite encoder 220 may be implemented as multiple collaborating components, and perhaps even nested components.

Back to the example message flow, message 201A is converted from an internal message format (e.g., XML) to a particular external message format as represented by encoded message 201B. In this case, the external message format is different than the internal message format. This is represented by the encoded message 201B being represented as a triangle, whereas before the message 201A was a circle. As an example, perhaps the triangle represents a binary message format.

Message 202A is converted from the internal message format into an encoded message 202B. In this case, the encoded message 202B is still in the same format as the original message 202A as each message 202A and 202B are symbolized as being circles. This demonstrates that the encoding process may not change the message format of the message, although some processing may be performed in the encoding.

Message 203A is converted from the internal message format into the encoded message 203B. In this case, the encoded message 203B is yet in another message format different than the internal message format. As an example, the square shape may symbolize JavaScript Object Notation (JSON). Although in some examples described herein, the internal message format is XML, and the external message formats are binary, XML, and JSON, the principles described herein may operate for any internal message format, and any number and identity of external message formats.

The composite encoder 220 is illustrated as including three constituent encoders 221, 222 and 223. Each constituent encoder may be responsible for encoding messages from the internal format into one of more external formats. In an example in which each encodes into only one external format, the encoder 221 might have encoded the message 201A into message 201B, the encoder 222 might have encoded the message 202A into message 202B, and encoder 223 might have encoded the message 203A into message 203B. For instance, encoder 221 might be a binary encoder, encoder 222 might be an XML encoder, and encoder 223 might be a JSON encoder.

The ellipses 224 represents that there may be other encoders suitable for encoding to yet other message formats. In fact, as will be described further herein, the composite encoder 220 is extensible to include additional encoders. Furthermore, the principles described herein are not even limited to currently existing message formats. As new message formats are developed, an appropriate encoder may be developed and added to the composite encoder 220.

The composite encoder 220 has associated therewith a selection mechanism 225 that selects, on a per-message basis, a constituent encoder to use when encoding a corresponding message. The principles described herein are not limited to how the selection mechanism 225 makes a selection decision. However, in one example, the selection mechanism 225 uses the content type of the corresponding message to identify a constituent encoder to use to encode that message. For instance, HyperText Transport Protocol (HTTP) messages contain headers that define a content type of the message contained in the HTTP message body. If, for example, the content type was image and sound data, perhaps a binary encoder would be selected. If, on the other hand, the content type was an object known to be in XML format, the XML encoder would be selected, and so forth.

In one specific implementation, the selection mechanism may in some cases be configured to make a selection of the encoder based on content type without even communicating with a constituent encoder. For instance, if for the moment, all outgoing messages are to be encoded as binary, the selection mechanism 225 may be temporarily at least configured to always select the binary encoder. Alternatively or in addition, the selection mechanism 225 may query the constituent encoders 221 through 223 themselves, perhaps in a predetermined order, as to whether they can encode messages of the designated content type. Once an encoder is found that can encode the designated content type, that encoder is selected to encode the message. This querying function of the selection mechanism 225 allows for additional constituent encoders to be added to the composite encoder 220. The additional constituent encoder would register with the selection mechanism 225 so that the encoder may be queried as to its capabilities to encode messages of a particular content type. Optionally, once the selection mechanism 225 is made aware of which encoder is capable of encoding which content type, the selection mechanism may cache that information for future encoder selection decisions.

In one embodiment, in which JSON, XML and binary are the supported external message formats, the selection mechanism might first query the JSON encoder, second the XML encoder, and third the binary encoder. Since a binary encoder is typically capable of handling encoding of all content types, the binary encoder may be a considered a fall-back encoder if the JSON and XML encoders could not encode a particular message.

The encoding environment also includes a per-message report mechanism 230, which allows information regarding the encoding (or decoding) of a message to be reported. For instance, information regarding the encoding of message 201A may be placed in location 231 of the report mechanism 230. Information regarding the encoding of message 202A may be placed in location 232 of the report mechanism 230. Information regarding the encoding of message 203A may be placed in location 233 of the report mechanism 230. The locations 231 through 233 may be in a centralized location, but alternatively, the locations 231 through 233 might actually be properties on the messages themselves. The ellipses 234 represents that there might be yet other locations for each other message encountered or to be encountered by the composite encoder 220

The arrow 241 represents that the composite encoder 220 may read encoding information from, and write encoding information to, the per-message report mechanism 230. Likewise, the arrow 242 represents that the internal system components 210 (or at least one of the internal system components) can read encoding information from, and write encoding information to, the per-message report mechanism.

If the encoding information specifies an actual encoding format to be applied to a message, the selection mechanism 225 may read that encoding format, and select the appropriate constituent encoder when encoding the message. In addition, the internal system components 210 may query the appropriate location to verify what encoding format a message will ultimately be sent using. This would allow the internal system component to make appropriate allowances and perform appropriate processing of a message given the information that the message will ultimately be encoded using a specific format.

For instance, suppose that a message is be encoded from an XML message format to a JSON message format, whereas another external format could have been XML. The JSON message format is fundamentally typed. For example, there is a difference between a number and a string in JSON message formats. XML format is fundamentally untyped in that everything, including numbers, is represented as strings. The encoding process from an XML internal format to a JSON external format would require type information, whereas if we are encoding to an XML message format, this type information would be superfluous. Thus, a serializer within the internal system components 210 could serialize differently (including or excluding type information as appropriate) depending on the encoding that the message will be subjected to.

In another example, one of the internal system components 210 might actually be a programming component that provides programming tools. A programmer might like to have some control over an encoding to be applied to a particular message. The programming tool might provide interfaces that allow the programmer to specify the encoding format.

The programming tool might also specify that a message is of a particular content type. This content type information may be provided into the per-message report mechanism 230. The composite encoder 220 may then override any contradicting default content type information that would be applied by the actual constituent encoder that performs the encoding, and instead would apply the content type designation instructed by the programmer.

The programming tool might also specify that a response to a message is of a particular content type. This content type information may be provided into the per-message report mechanism 230. When a response to the message is received, the selection mechanism 225 may use the content type information specified by the programmer, and select the appropriate decoder based on that content type.

For example, consider the following source code examples that might represent function calls offered by a programming component of the internal system components 210:

```
[OperationContract] Person GetPerson( );
[OperationContract] Stream GetPicture( );
[WebInvoke(ResponseType=Json)] [OperationContract] Person
GetPersonJson( );
```

The programming component (or perhaps some formatter/serializer-level code) may indicate to the encoding process that the GetPerson method is supposed to return a response that has an XML external message format, that the GetPicture method is supposed to return a response that has a binary external message format (e.g., an image), and that the GetPersonJson method is supposed to return a response that has a JSON external message format. Such indications may be provided into the per-message report mechanism 230.

FIG. 3 illustrates a decoding environment 300, which is quite similar to the encoding environment 200. In fact, the composite encoder 220 of FIG. 2 and the composite decoder 320 of FIG. 3 may be integrated into a single composite encoder/decoder. Also, the per-message reporting mechanism 330 of FIG. 3 may be the same as the per-message reporting mechanism 230 of FIG. 2. Likewise, the internal system components 310 of FIG. 3 may be the same as the internal system components 210 of FIG. 2.

In the decoding example, three messages 301B, 302B and 303B are received by the composite decoder 320. Other messages 304B may also be received. Each of the three messages 301B, 302B and 303B are of a different external format. For instance, similar to FIG. 2, message 301B may be a binary message format, message 302B may be an XML message format, and message 303B may be a JSON message format. The constituent decoders 321 through 324 of the composite decoder 320 may be the same as the corresponding constituent encoders 221 through 224 of the composite encoder 220.

The decoder 321 decodes encoded message 301B having one external format (e.g., binary) into message 301A having the internal message format (e.g., XML). The decoder 322 decodes encoded message 302B having external format (e.g., XML) into message 302A having the internal message format. The decoder 323 decodes encoded message 303B having one external format (e.g., JSON) into message 303A having the internal message format. Other messages may be decoded as represented by the vertical ellipses 304A. The system components 311 through 313 may then process the messages 301A through 304A since they are structured in the internal message format.

The per-message report mechanism 330 may be used by the composite decoder 320 and the internal system components 310 as an accessible location to store decoding information on a per-message basis.

The selection mechanism 325 may select the appropriate decoder 321 through 323 for each incoming message. The selection mechanism 325 may automatically detect an external format of each in-coming message. For instance, the selection mechanism 325 might examine the per-message report mechanism 330 to determine if there is any specified message format for the received message. The selection mechanism 325 might also identify a content type of the incoming message, then itself decide the appropriate decoder based on that content type. The selection mechanism 325 might also inquire of the decoders 321 through 323 as to whether they are capable of decoding messages of the particular designated content type.

Several examples will now be described illustrating how decoding information in the per-message report mechanism 330 may be used. In one example, the composite decoder might specify during the decoding process what the original external message format was corresponding to a particular incoming message. The internal system components may discover that external message format by querying the per-message report mechanism 330. The internal system components might then perform appropriate format specific processing depending on what the external message format was.

For example, consider an incoming message that could be either in XML or JSON message format, and consider a system where the internal message format is always XML. Both the incoming message having the XML external message format and the incoming message having the JSON external message format would be decoded to the XML internal message format. However, perhaps a different deserializer should be used when the message is processed further depending on whether the external message format was XML or JSON. One reason this might be is because XML is fundamentally an ordered format and JSON is fundamentally unordered, and the serializer needs to know whether to proceed in an ordered or unordered way.

In a programming model example, consider the following operation:
[OperationContract] PutPerson(Person p);

In this case, perhaps the PutPerson method is desired to automatically select the right serializer (for JSON or XML) depending on whether an incoming message is in JSON or XML.

As a second example of using the decoding information, perhaps one of the internal system components is to validate whether or not an incoming message is valid depending on its external message format. If the incoming message format arrived in a valid external message format, the message may be validated, and otherwise rejected. The validation may be based on certain programming model constructs, such as inferring an acceptable data format automatically based on certain things such as the types used.

In a programming model example, consider the following operation:
[OperationContract] PutPicture(Stream s);

In this case, perhaps the method PutPicture is to only accept binary messages. The decoding information allows validation of the corresponding binary message.

As previously mentioned, the decoding information allows one or more of the internal system components 310 to perform further processing in a format-dependent way. After this processing, the message may further be represented in yet other internal system components in a format-independent way. For instance, once the message is validated or deserialized depending on the external message format, the message may then be further processed using its internal message format, regardless of what its external message format was.

Accordingly, the principles described herein permit a flexible mechanism for encoding and/or decoding messages across a variety of external message formats. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer storage device having stored thereon computer-executable instructions that, when executed by one or more processors of a computing system, cause the computing system to perform the following:
  an act of receiving a request from an internal processing component to write a hierarchical type data structure that is structured in an eXtensible Markup Language (XML) or other Infoset hierarchical data format onto a network communication channel, wherein the internal processing component is an XML or other Infoset hierarchical type processor;
  evaluating and determining a type of content contained in the XML or other Infoset hierarchical data structure and,
    when the type of content contained in the XML or other Infoset hierarchical data structure is a first type of content, an act determining that the XML or other Infoset hierarchical data structure is to be converted into an equivalent binary data structure prior to being written onto the network communication channel rather than writing the XML or other Infoset hierarchical data structure to the network communication channel as designated by the XML or other Infoset hierarchical type of the internal processing component, and
    when the type of content contained in the XML or other Infoset hierarchical data structure is a second type of content that is different from the first type of content, an act determining that the XML or other Infoset hierarchical data structure is to be converted into a data structure of a type other than said equivalent binary data structure prior to being written onto the network communication channel;
  an act of automatically transforming the hierarchical data structure into the determined equivalent binary data or the determined data structure of a type other than said equivalent binary data structure, even though not requested by the XML or other Infoset type processing component and thereby overriding default content type information of the XML or other Infoset hierarchical data format; and
  an act of writing the transformed hierarchical data structure onto the network communication channel.

2. The computer program product recited in claim 1, wherein the request is received at a composite encoder.

3. The computer program product recited in claim 1, wherein the hierarchical type data structure is structured in an XML format.

4. The computer program product recited in claim 1, wherein the request is received on a per message basis for each of a plurality of messages.

5. A method for converting hierarchical data to binary data, comprising: at a computing system having at least one processor and at least one computer readable medium, using the at least one processor to execute computer-executable instructions stored on the computer readable medium, thereby causing the computing system to:
  process a request from an internal processing component to write a hierarchical type data structure that is structured in an eXtensible Markup Language (XML) or other Infoset hierarchical data format onto a network communication channel, wherein the internal processing component is an XML or other Infoset hierarchical type processing component;
  evaluate and determine a type of content contained in the XML or other Infoset hierarchical data structure and, when the type of content contained in the XML or other Infoset hierarchical data structure is a first type of content, determine that the XML or other Infoset hierarchical data structure is to be converted into an equivalent binary data structure prior to being written onto the network communication channel rather than writing the XML or other Infoset hierarchical data structure to the network communication channel as designated by the XML or other Infoset hierarchical type of the internal processing component, and when the type of content contained in the XML or other Infoset hierarchical data structure is a second type of content that is different from the first type of content, an act determining that the XML or other Infoset hierarchical data structure is to be converted into a data structure of a type other than said equivalent binary data structure prior to being written onto the network communication channel;

automatically transform the hierarchical data structure into the determined equivalent binary data or the determined data structure of a type other than said equivalent binary data structure, even though not requested by the XML or other Infoset type processing component and thereby overriding default content type information of the XML or other Infoset hierarchical data format; and encode the transformed hierarchical data structure onto the network communication channel.

6. The method recited in claim 5, wherein the request is sent from an internal system component to a composite encoder.

7. The method recited in claim 5, wherein the hierarchical type data structure is structured in an XML format.

8. The method recited in claim 5, wherein the request is specific to a particular message to be sent onto the network communication channel.

9. A computing system, comprising:
an internal Infoset processing component capable of processing XML or other Infoset data;
a per message report mechanism; and
a composite encoder configured to receive Infoset data for transmission over a network communication channel through the network access module, the composite encoder having a plurality of different encoders configured to encode received data structures into different types of equivalent data structures based at least in part on a determined type of content contained in the received data structures, wherein the composite encoder is configured to:

process a request from the internal Infoset processing component to write a hierarchical type data structure that is structured in an eXtensible Markup Language (XML) or other Infoset hierarchical data format onto a network communication channel;

evaluate and determine a type of content contained in the XML or other Infoset hierarchical data structure and, when the type of content contained in the XML or other Infoset hierarchical data structure is a first type of content, determine that the XML or other Infoset hierarchical data structure is to be converted into an equivalent binary data structure prior to being written onto the network communication channel by a first encoder in the plurality of different encoders rather than writing the XML or other Infoset hierarchical data structure to the network communication channel as designated by the XML or other Infoset hierarchical type of the internal Infoset processing component, and when the type of content contained in the XML or other Infoset hierarchical data structure is a second type of content that is different from the first type of content, an act determining that the XML or other Infoset hierarchical data structure is to be converted into a data structure of a type other than said equivalent binary data structure prior to being written onto the network communication channel;

automatically transform the hierarchical data structure into the determined equivalent binary data or the determined data structure of a type other than said equivalent binary data structure, by the first encoder even though not specifically requested by the internal Infoset processing component and thereby overriding default content type information of the XML or other Infoset hierarchical data format; and write the transformed hierarchical data structure onto the network communication channel.

10. The computing system recited in claim 9, wherein the request is sent from an internal system component to a composite encoder.

11. The computing system recited in claim 9, wherein the hierarchical type data structure is structured in an XML format.

12. The computing system recited in claim 9, wherein the request is received on a per message basis for each of a plurality of messages and such that the request is specific to a particular message to be written onto the network communication channel.

* * * * *